Jan. 1, 1946.  A. E. JOEL, JR  2,392,090
BUSY TEST SYSTEM
Filed Feb. 20, 1943  16 Sheets-Sheet 1
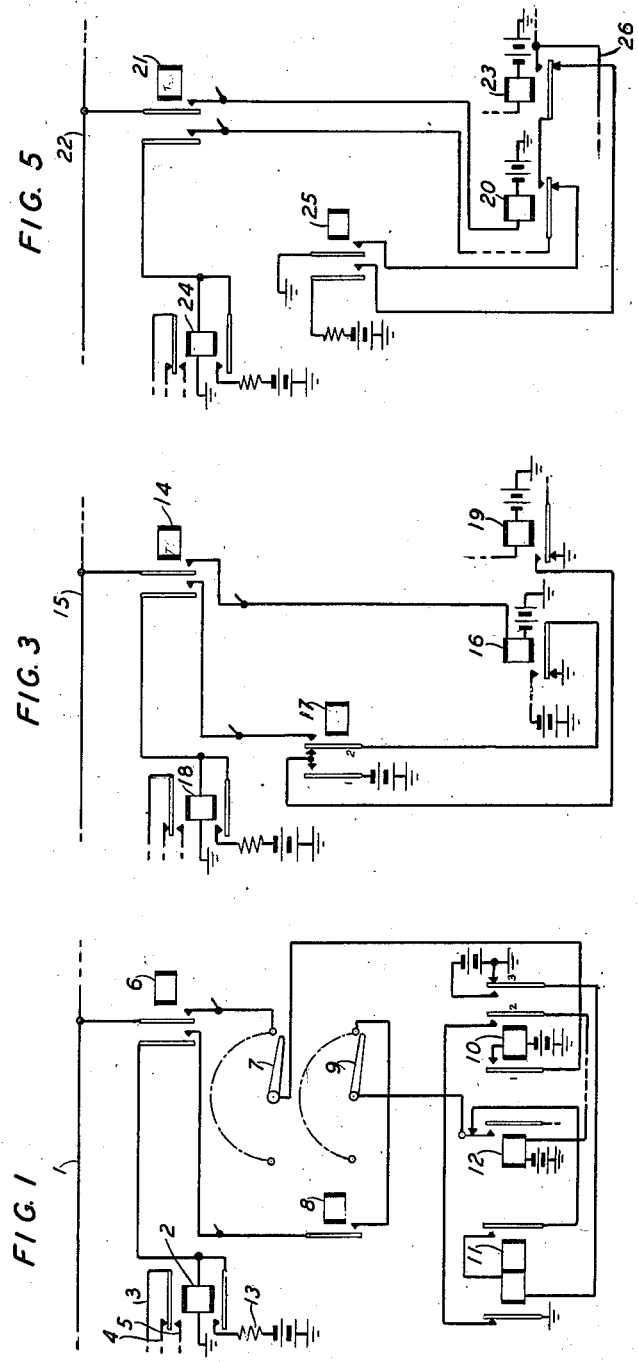
INVENTOR
A. E. JOEL JR.
BY
ATTORNEY

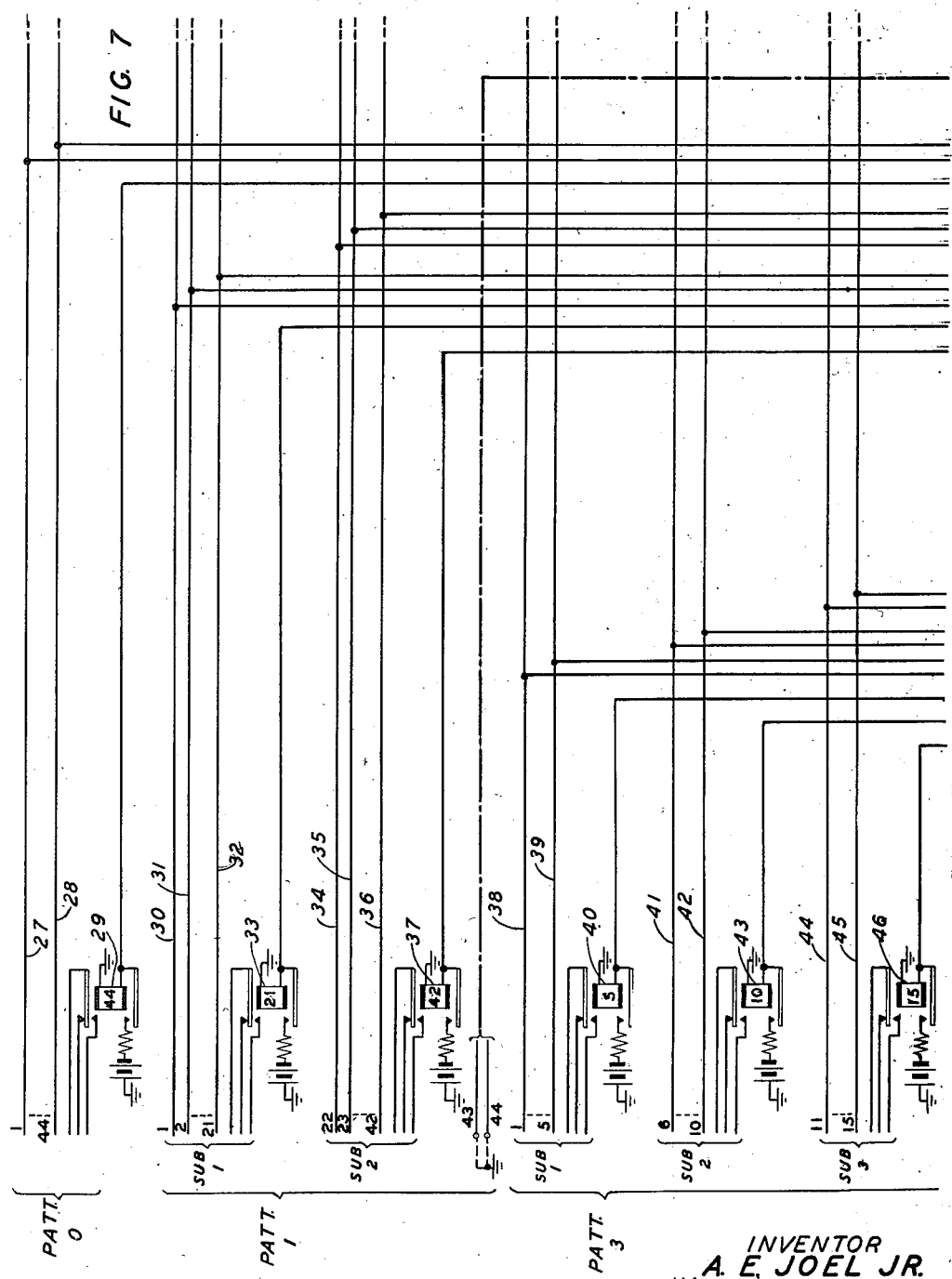

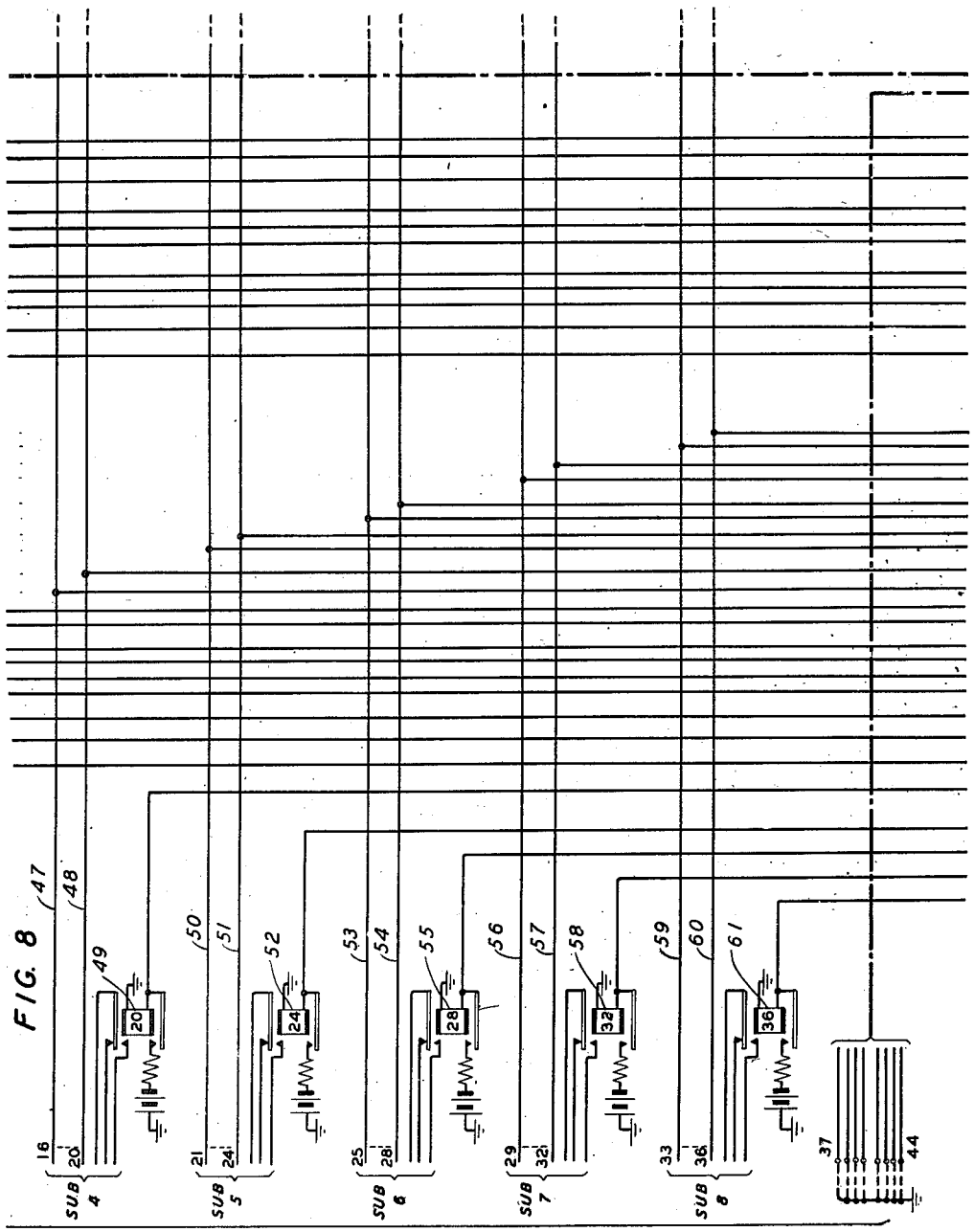

Jan. 1, 1946.　　　A. E. JOEL, JR　　　2,392,090
BUSY TEST SYSTEM
Filed Feb. 20, 1943　　　16 Sheets-Sheet 7

INVENTOR
A. E. JOEL JR.
BY
ATTORNEY

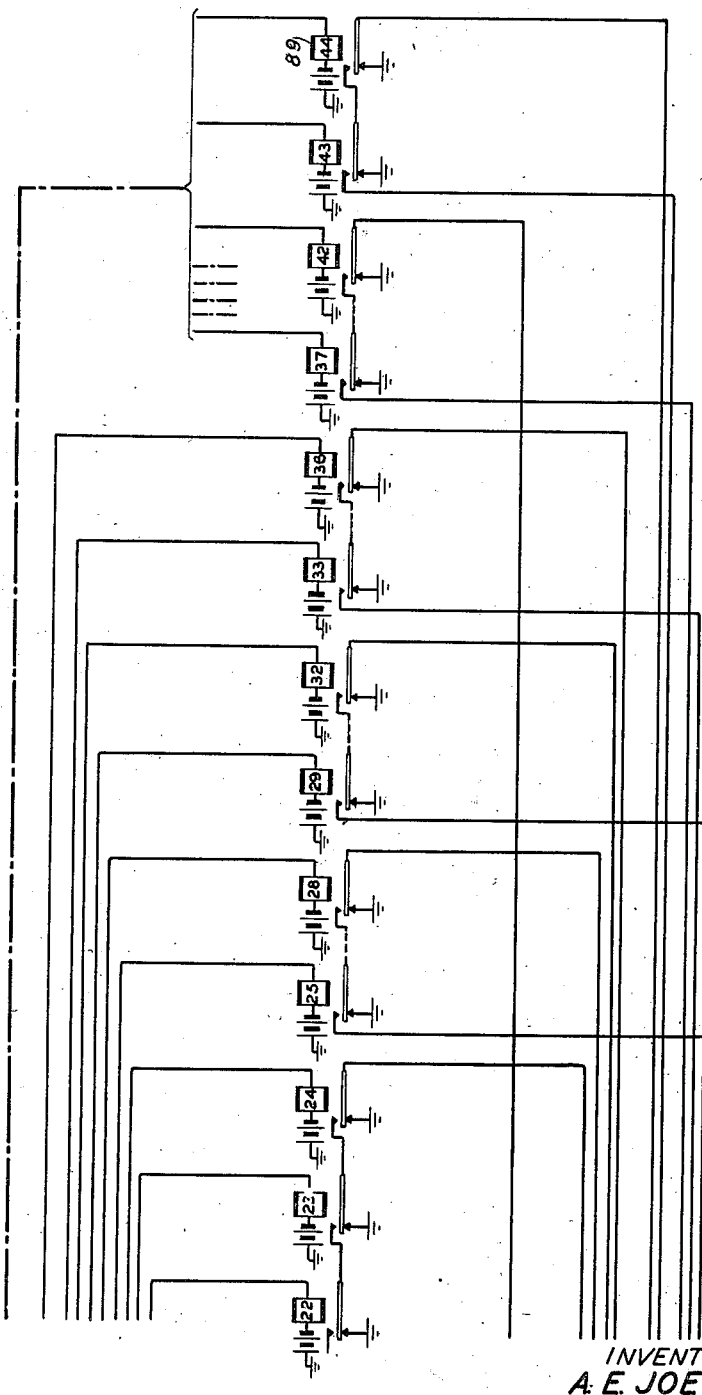
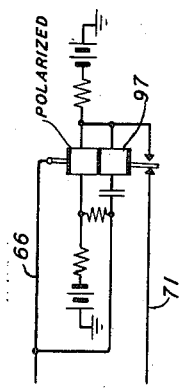
FIG. 15

Jan. 1, 1946.   A. E. JOEL, JR   2,392,090
BUSY TEST SYSTEM
Filed Feb. 20, 1943   16 Sheets-Sheet 14

INVENTOR
A. E. JOEL JR.
BY John A. Hall
ATTORNEY

Jan. 1, 1946. A. E. JOEL, JR 2,392,090
BUSY TEST SYSTEM
Filed Feb. 20, 1943 16 Sheets-Sheet 16

INVENTOR
A. E. JOEL JR.
BY
ATTORNEY

Patented Jan. 1, 1946

2,392,090

UNITED STATES PATENT OFFICE 2,392,090

BUSY TEST SYSTEM

Amos E. Joel, Jr., New York, N. Y., assignor to Bell Telephone Laboratories, Incorporated, New York, N. Y., a corporation of New York Application February 20, 1943, Serial No. 476,514

9 Claims. (Cl. 179—175.2)

This invention relates to testing devices and particularly to means for testing the busy conditions of groups of similar electrical circuits.

The object of the present invention is to periodically test the busy condition of the lines of a group and upon each test to establish a marking condition which will be found when such group is approached in regular service. If all the lines of the group are busy then a group busy condition is established which condition remains fixed regardless of any change in condition of any of the lines within the group until another test is made. If such tests are made at frequent intervals a common testing device may be used instead of the individual means heretofore employed. While theoretically the individual testing devices are more accurate in instantaneously reporting the conditions obtaining at any instant, it has been found that the present arrangement is practically advantageous since the saving of time achieved thereby is of more importance than an occasional call directed over an alternative route.

In accordance with the present invention all circuits to be tested are connected, group by group, by means of multicontact relays to a common testing circuit. At the same time certain group busy relays are also connected to the common testing circuit so that their condition may be changed in accordance with the condition in which the individual circuits of the corresponding groups are found.

A feature of the invention is a common testing circuit in combination with means for temporarily associating such circuit both with a group of similar circuits and with a marking device for temporarily displaying the condition of such group of circuits until a succeeding test can be made.

Further in accordance with the invention the groups of similar electrical circuits to be tested are divided into subgroups so that a fixed size common testing device may be used to full capacity. Therefore, the device includes a number of so-called pattern relays each one acting to notify the testing circuit which particular pattern of subgroups is under test.

Another feature of the invention is a testing device including a plurality of pattern relays each functioning to condition the said testing circuit for cooperating with a different pattern of subgroups of similar electrical circuits.

Another feature is a testing circuit for successively testing a plurality of similar circuits in combination with a pattern determining means for marking the end of each group of such circuits. The total capacity of the testing device may be divided into any number of various patterns of group sizes and the pattern determining means is employed to control the testing device so that the group busy marking means may be properly controlled.

Another feature is a chain testing circuit for simultaneously testing a plurality of similar circuits in combination with a pattern determining means for working the said chain circuit to simultaneously test a plurality of groups of such lines and to report to and control a busy marking means associated with each such group.

Still another feature is a pattern determining means for breaking a chain circuit into a plurality of smaller chains each capable of separately performing the functions of the whole. In accordance with this feature the whole chain may be successively broken up into any number of different patterns at high speed each division being of a temporary nature.

Other features will appear hereinafter.

The drawings consist of sixteen sheets having twenty-one figures, as follows:

Fig. 1 is a schematic circuit diagram showing one species of the invention in which the lines of a group are tested sequentially;

Fig. 2 is a block diagram showing how Figs. 7 to 12 inclusive, are to be placed together to form a complete circuit diagram of the arrangement illustrated in Fig. 1;

Fig. 3 is a schematic circuit diagram showing a second species of the invention in which the lines of a group are tested simultaneously;

Fig. 4 is a block diagram showing how Figs. 7, 8, 9, 10, 13, 14 and 15 are to be placed together to form a complete circuit diagram of the arrangement illustrated in Fig. 3;

Fig. 5 is a schematic circuit diagram showing a third species of the invention in which the lines of a group are tested simultaneously;

Fig. 6 is a block diagram showing how Figs. 7, 8, 16, 17, 18, 19, 20 and 21 are to be placed together to form a complete circuit diagram of the arrangement illustrated in Fig. 5;

Figs. 7 and 8 are circuit diagrams representing various sized groups of lines arranged in various patterns;

Figs. 9 and 10 are circuit diagrams showing the multi-contact relays for connecting the various groups of lines and their associated group relays to the common testing apparatus;

Figure 9:
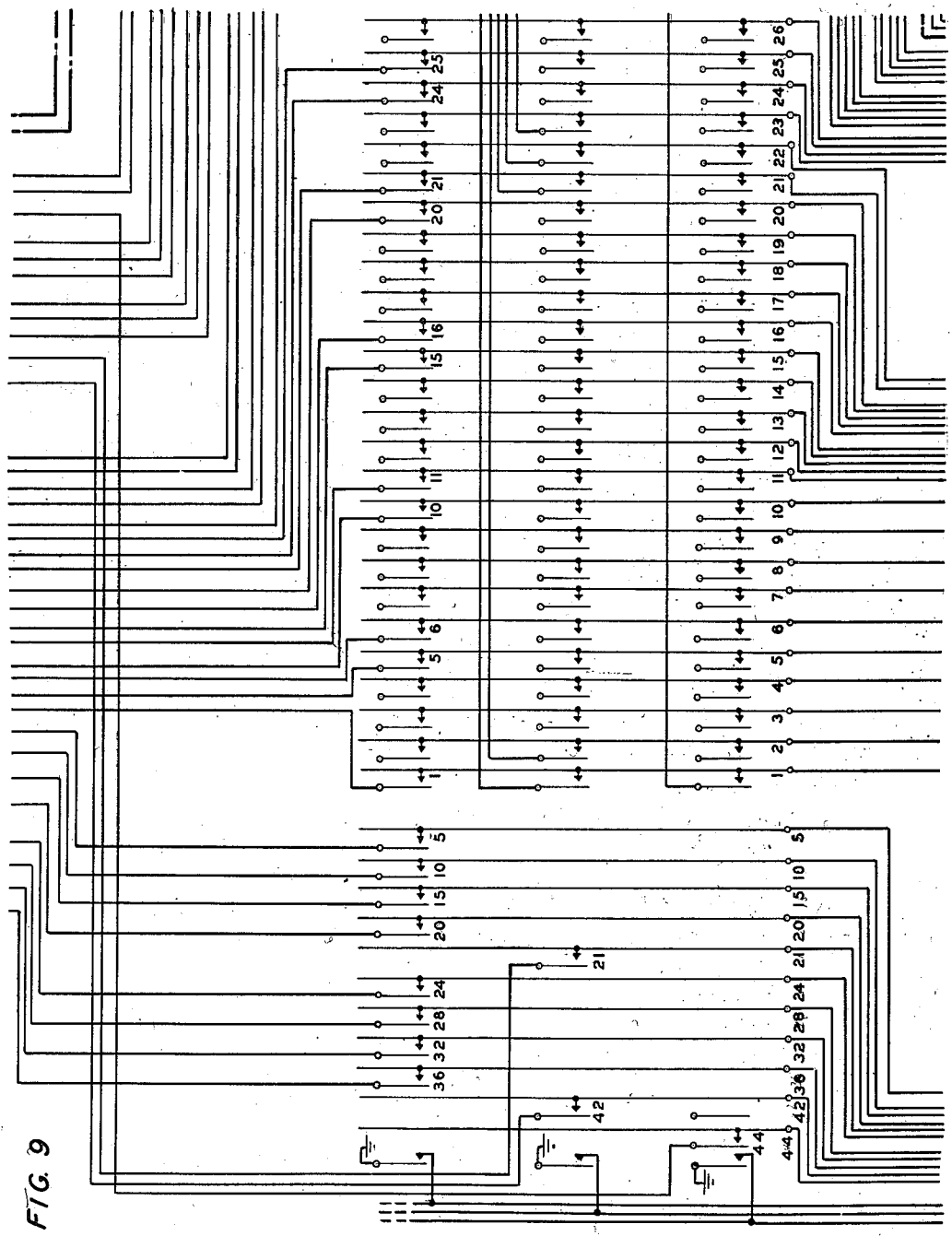
Figure 10:
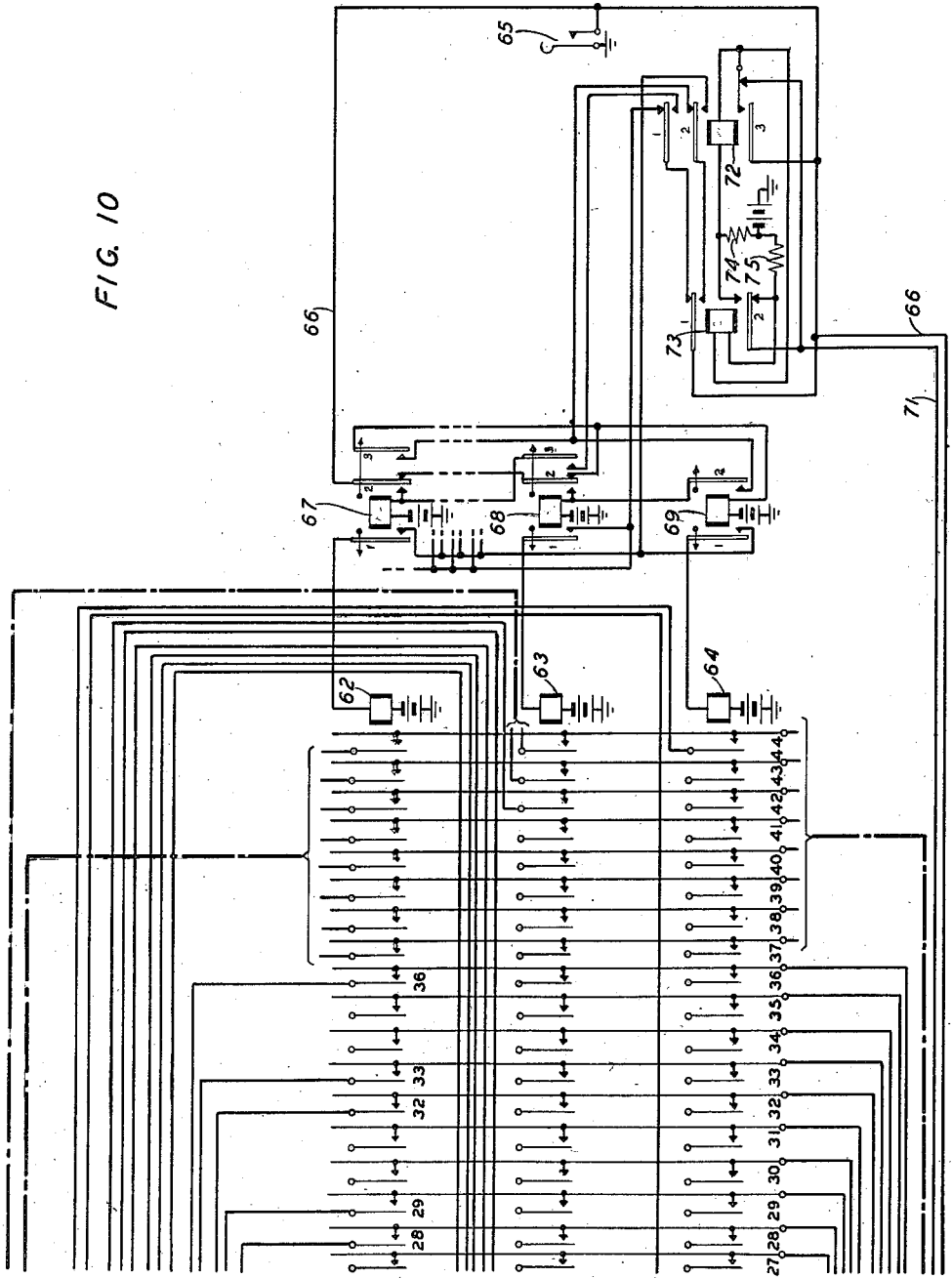
Figure 11:
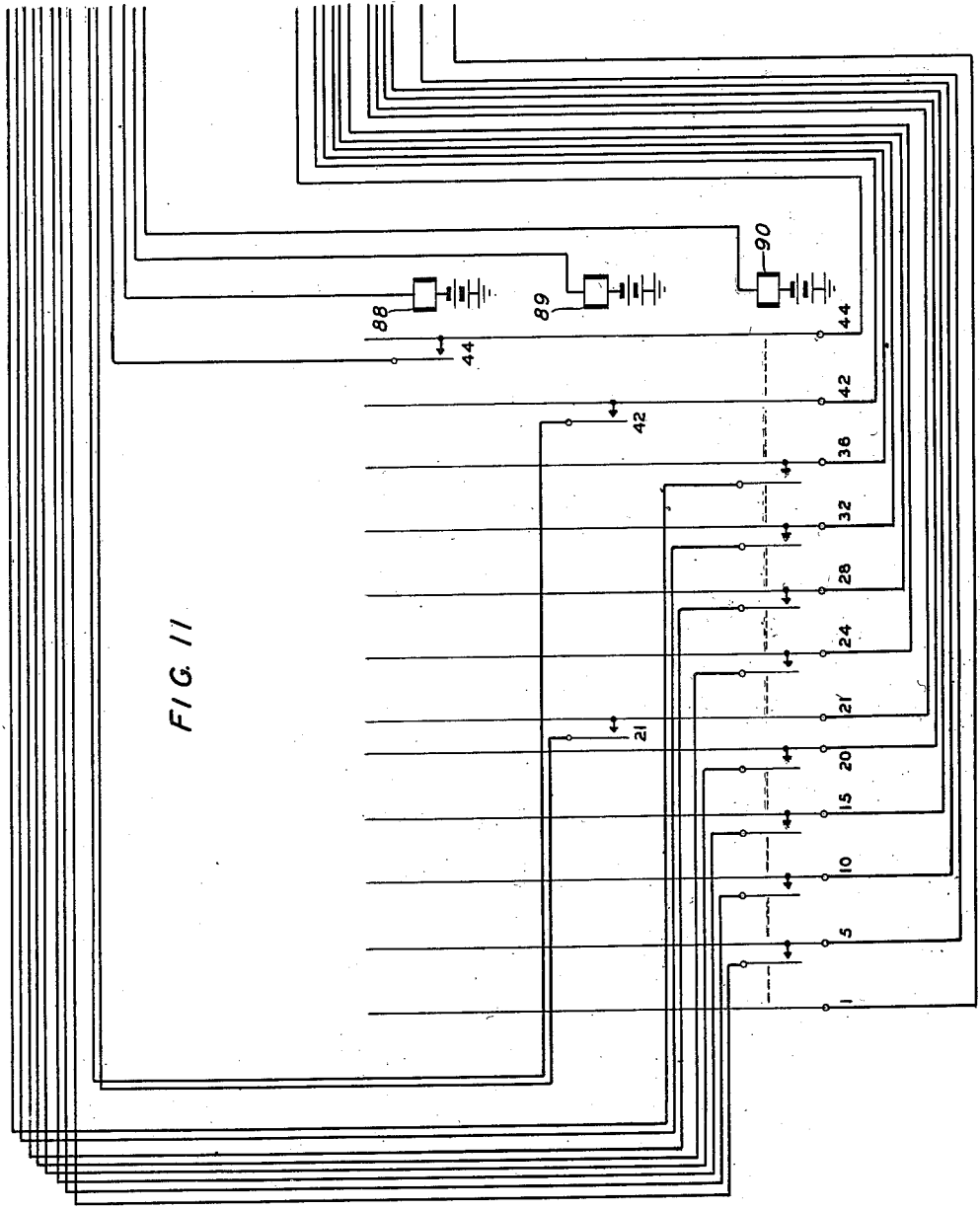
Figure 12:
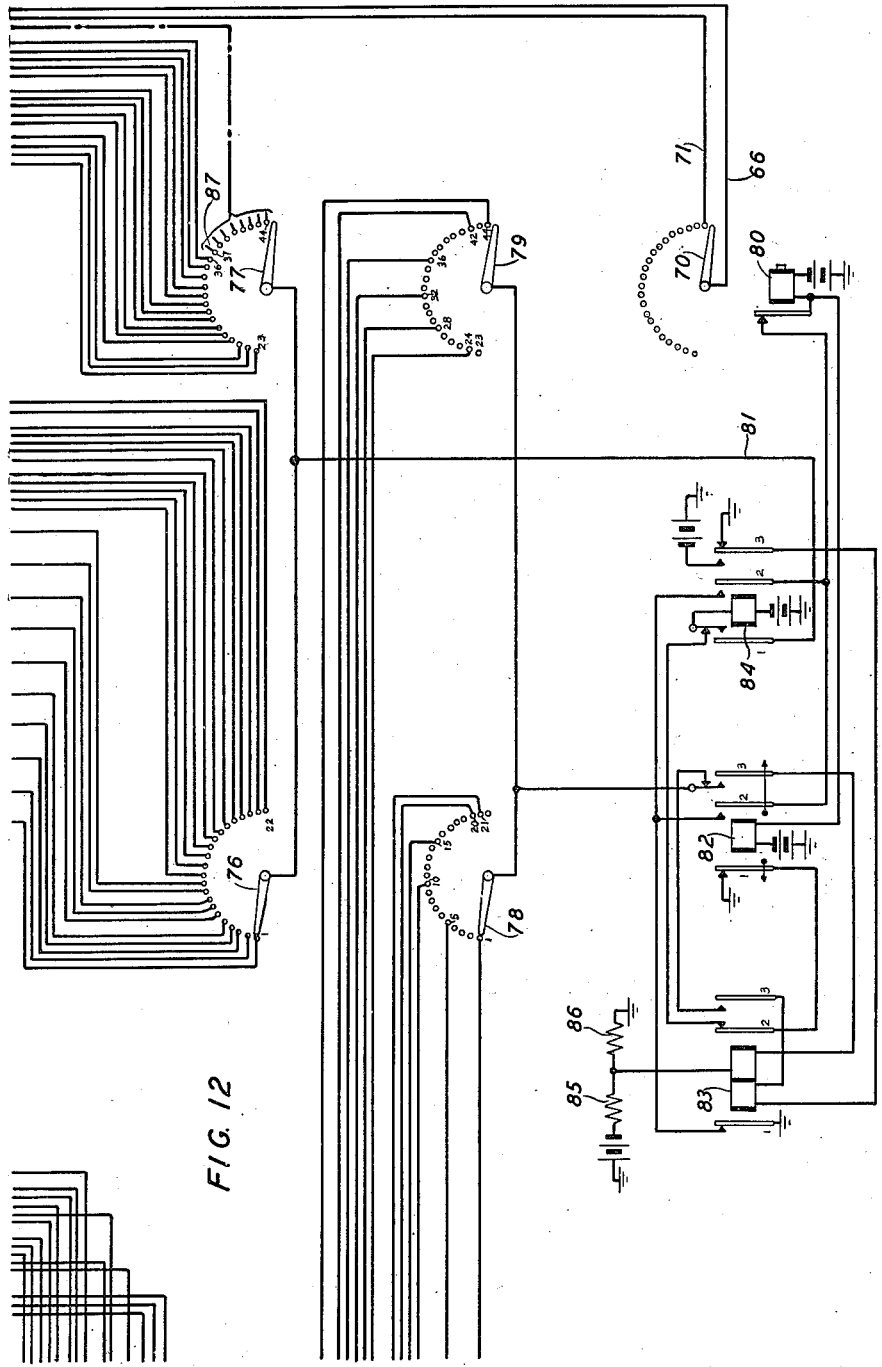
Figure 13:
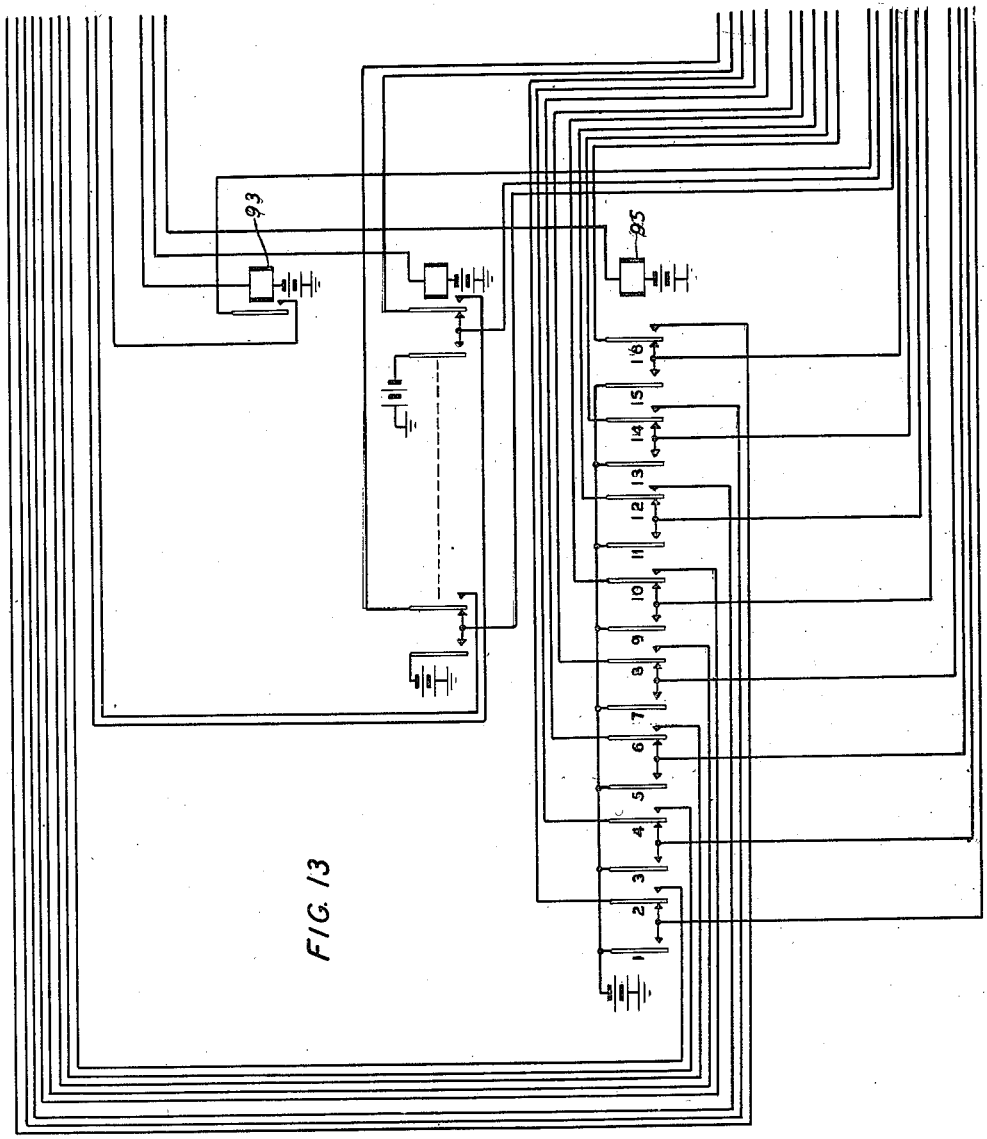
Figure 14:
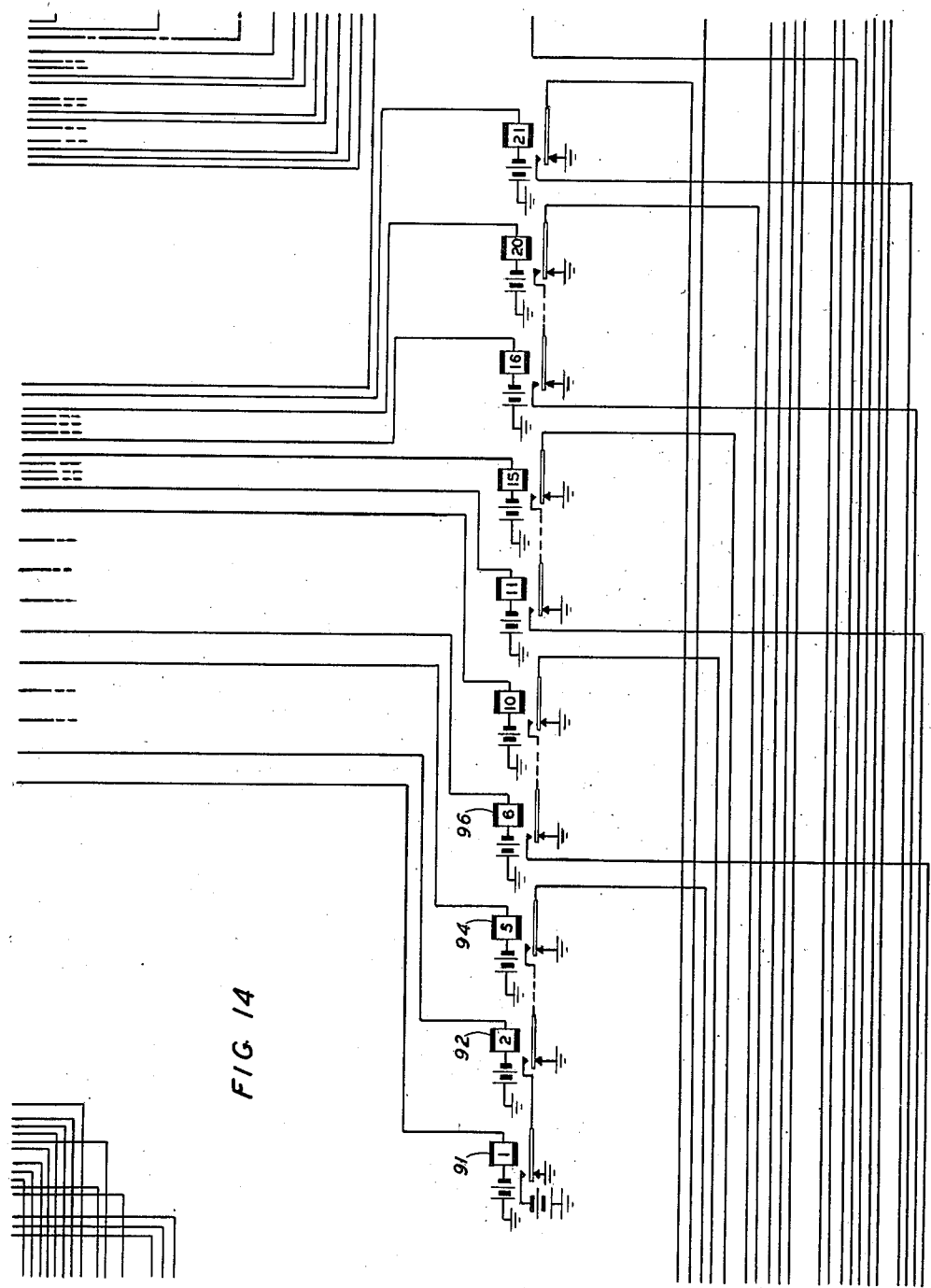
Figure 16:
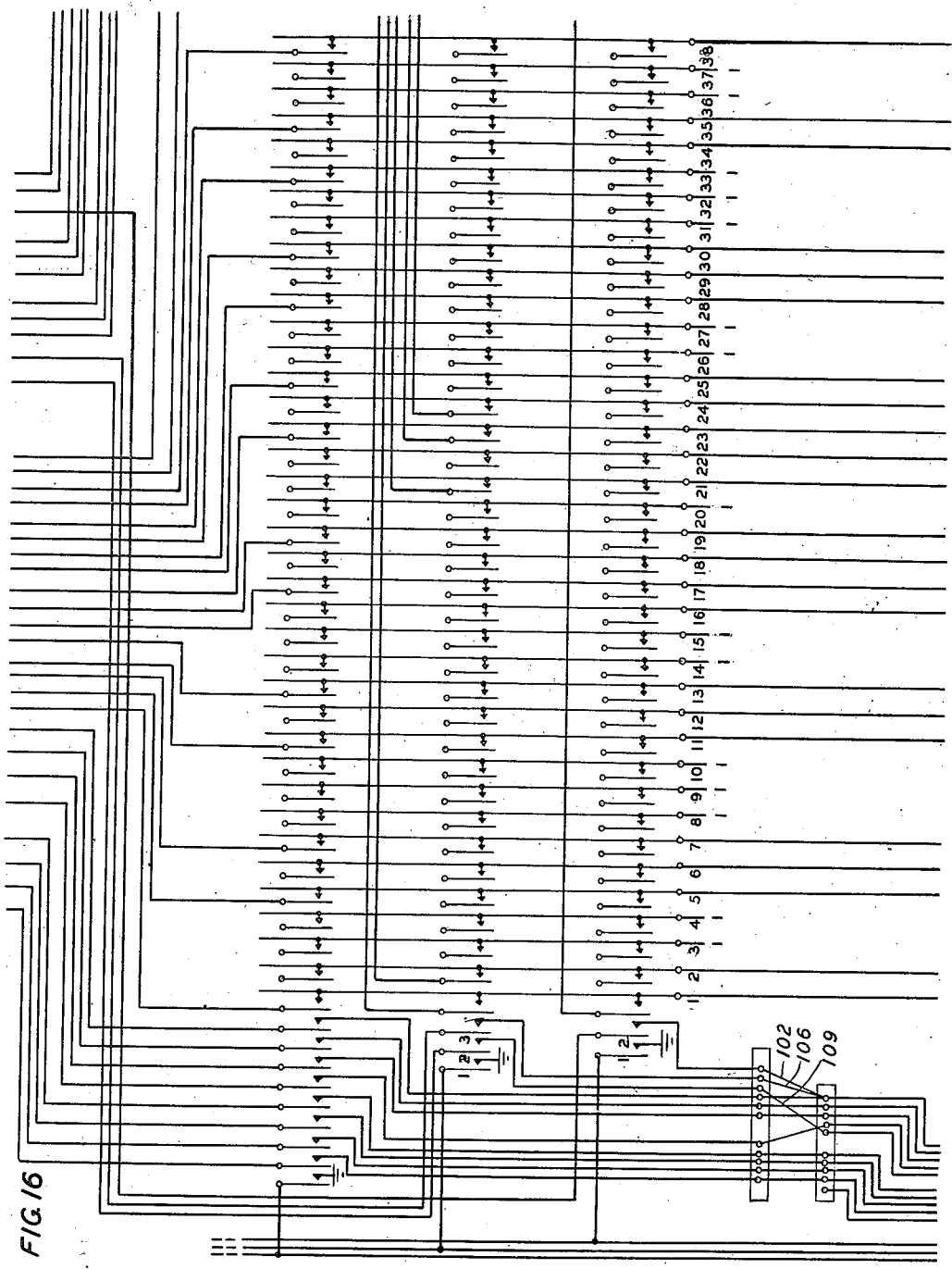
Figure 17:
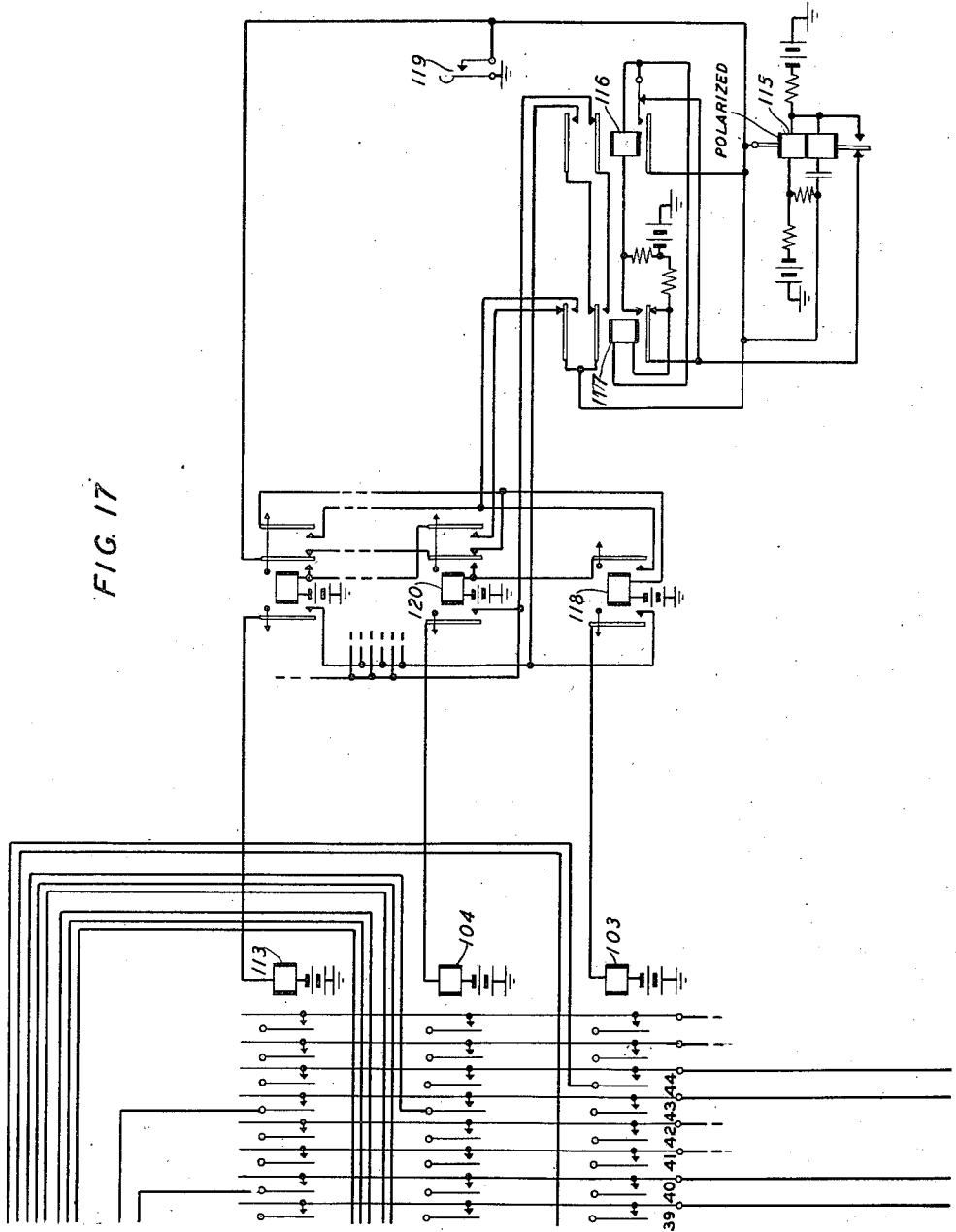
Figure 18:
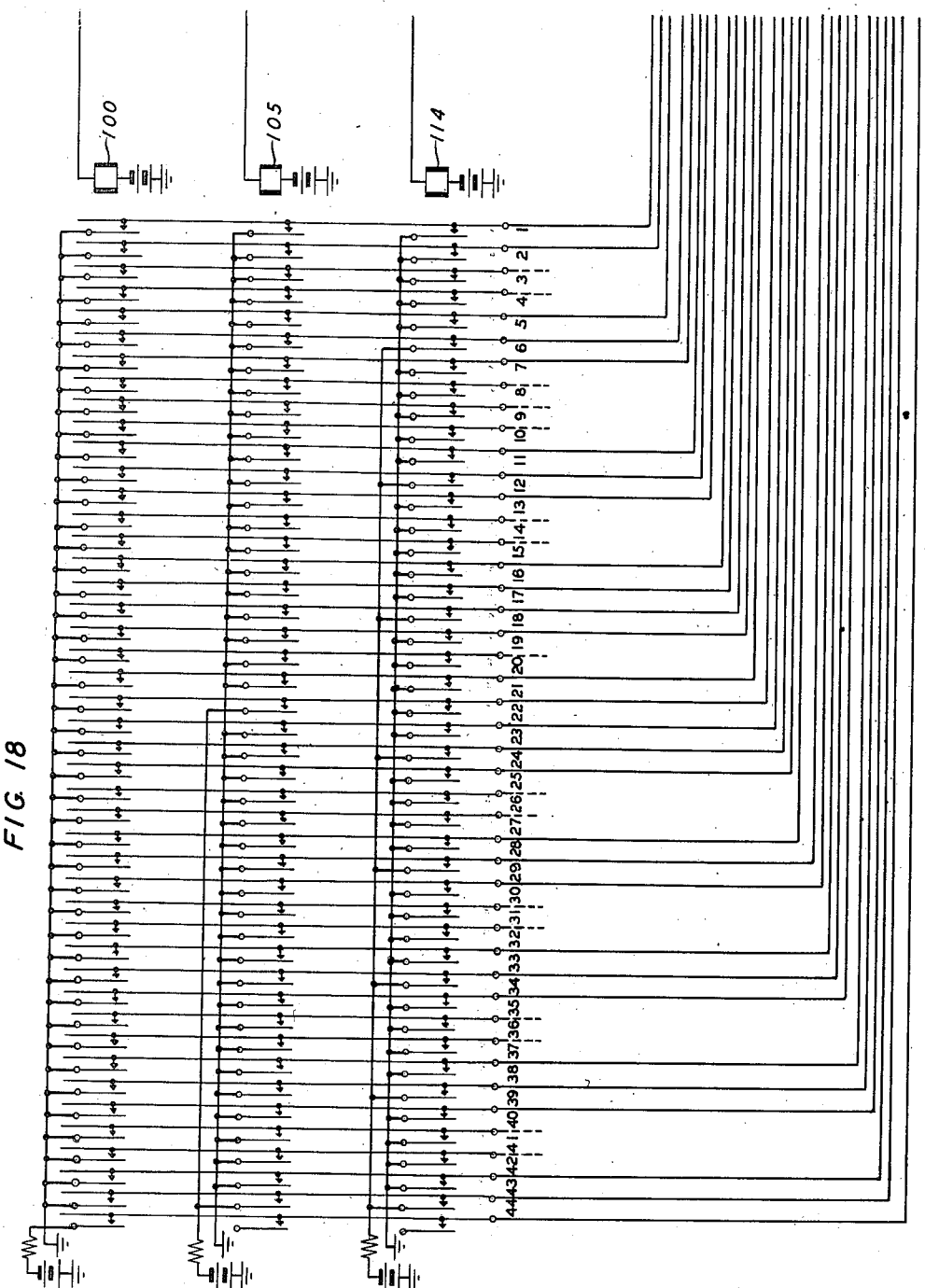
Figure 19:
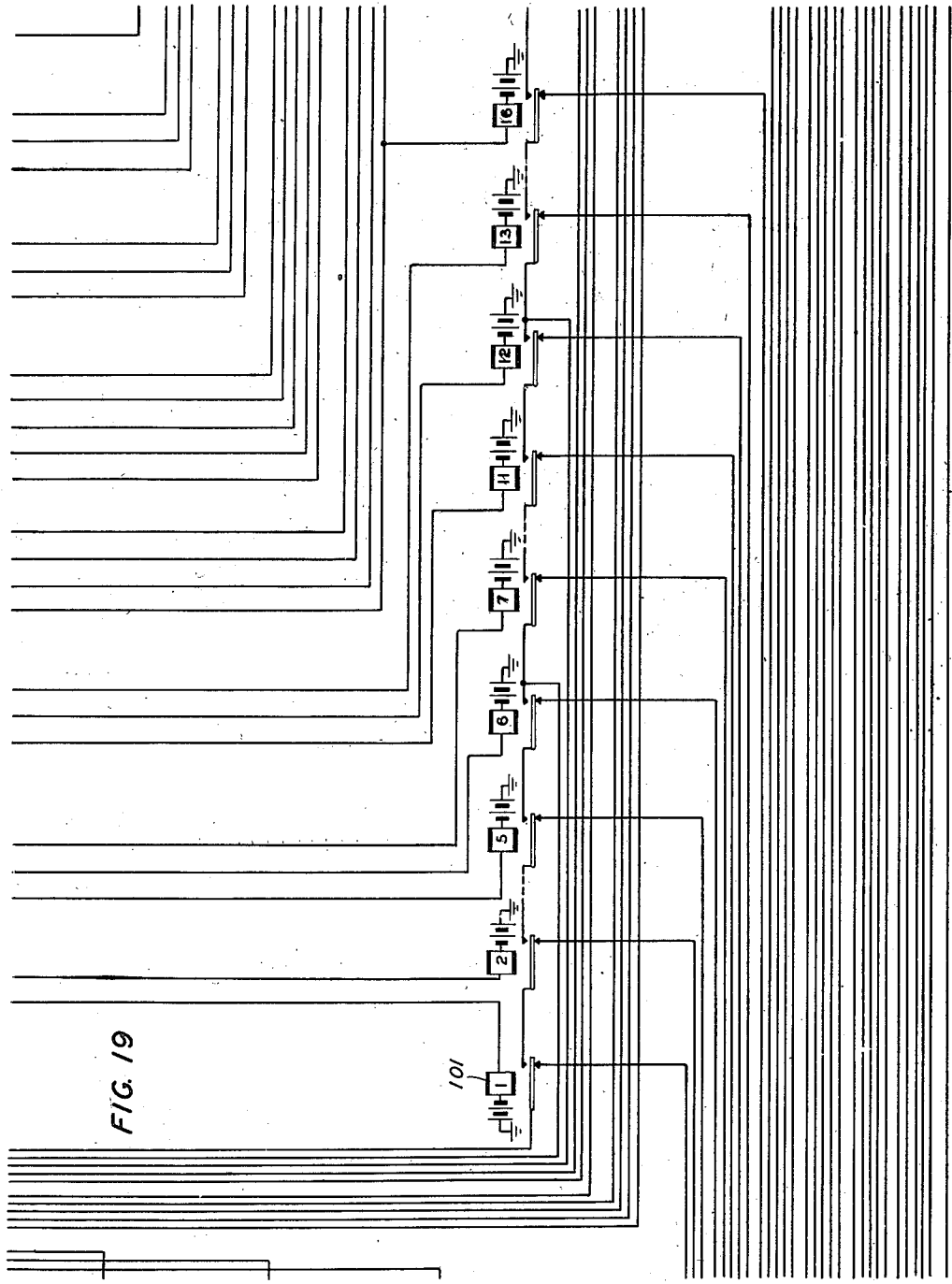
Figure 20:
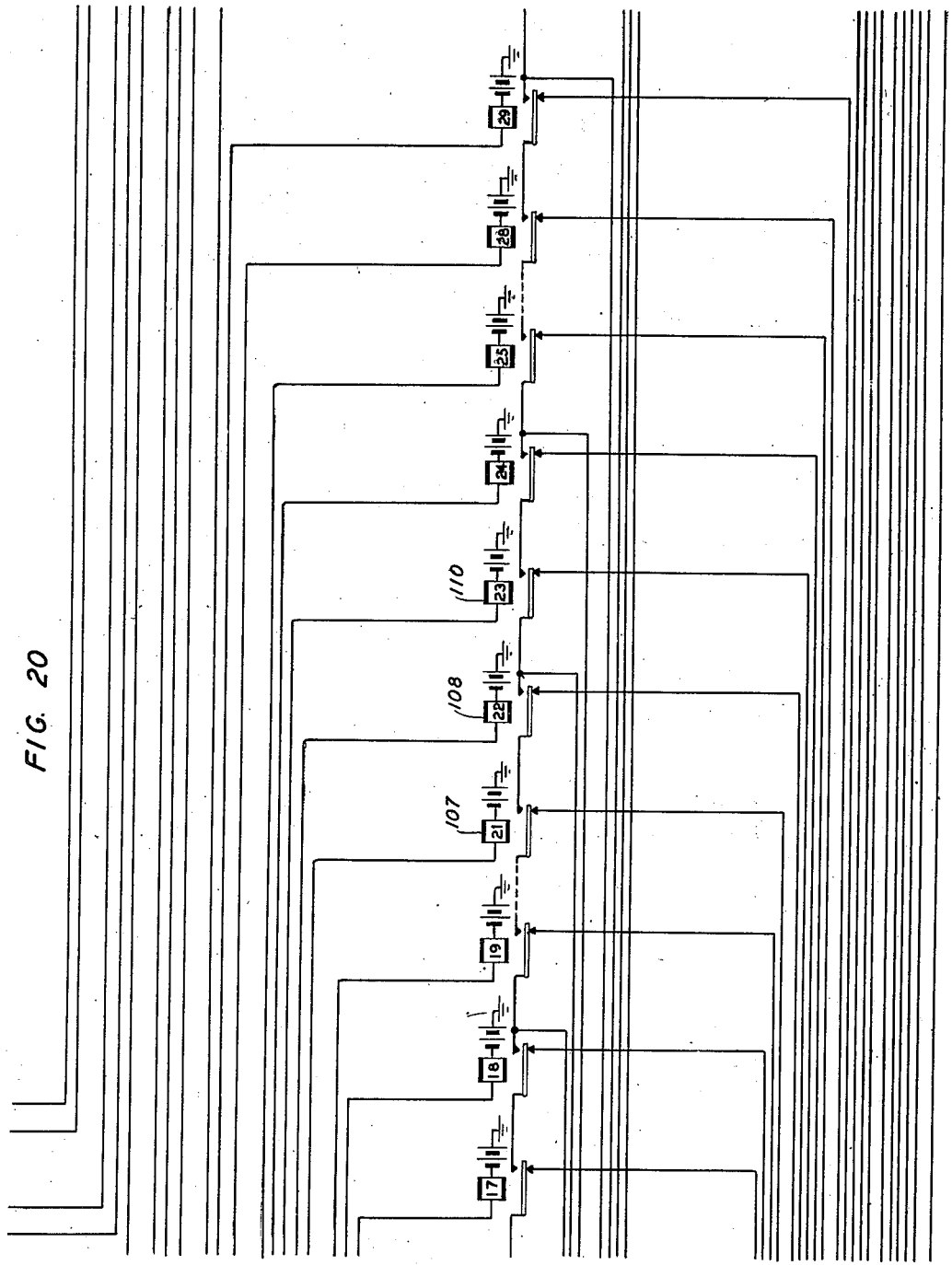
Figure 21:
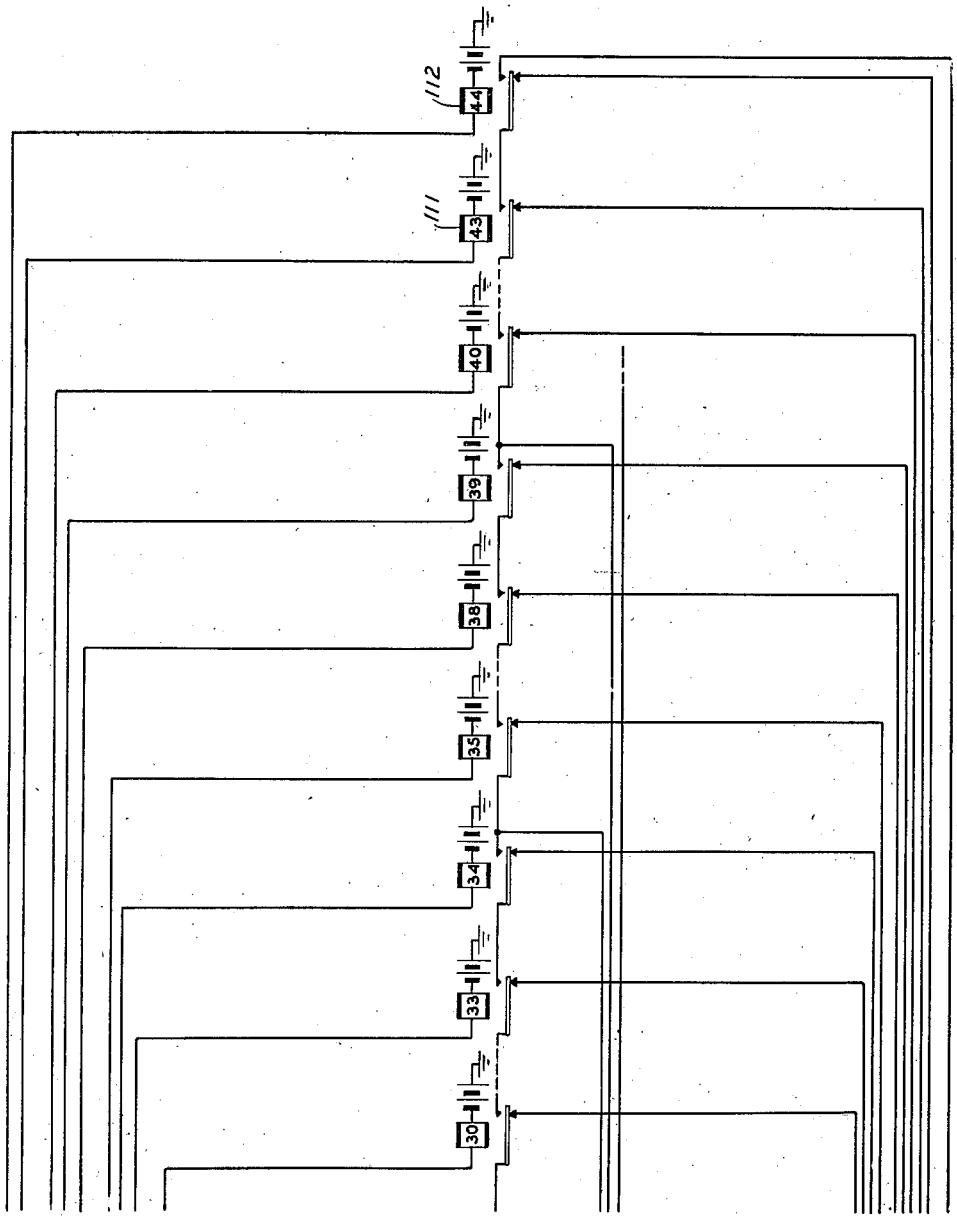

Fig. 10 also shows the chain sequence circuit for controlling the operation of the said multicontact relays. These two figures are used in the arrangements of Figs. 1 and 3;

Fig. 11 is a circuit diagram showing the arrangement of the common pattern relays of the type used in the arrangement of Fig. 1;

Fig. 12 is a circuit diagram showing the type of common testing circuit employed in the arrangement of Fig. 1;

Fig. 13 is a circuit diagram similar to that of Fig. 11 showing the arrangement of the common pattern relays of the type used in the arrangement of Fig. 3;

Figs. 14 and 15 are circuit diagrams showing the common testing relays used in the arrangement of Fig. 3;

Figs. 16 and 17 are circuit diagrams similar to Figs. 9 and 10 showing the multicontact relays for connecting the various groups of lines and their group relays to the common testing means. Fig. 17 in a manner similar to Fig. 10 also shows the chain sequence circuit for controlling the said multicontact relays. This arrangement is used in the arrangement of Fig. 5;

Fig. 18 is a circuit diagram showing the arrangement of the common pattern relays used in the arrangement of Fig. 5; and, Figs. 19, 20 and 21 are circuit diagrams showing the common testing relays used in the arrangement of Fig. 5.

The inventions disclosed herein are intended primarily to be used in large telephone systems but may be applied elsewhere. Generally speaking there are a large number of groups of lines such as conductor 1 which may be the sleeve of a trunk which is grounded when in use. Associated with each group of lines is a trunk group busy relay 2 whose function it is to transfer a lead 3 from a normal route circuit 4 to an alternate route circuit 5. If all the trunks of the group including the conductor 1 are busy then it is desired to have the trunk group busy relay 2 operated so that when an idle trunk is being sought by an operation over the conductor 3 no time will be wasted in operating over the conductor 4 which is associated with this busy group but an operation will immediately be conducted over the alternate route conductor 5. In case there is no alternate route the relay 2 may be employed to place an all trunks busy condition signal on conductor 3. Therefore, when the trunk group connector relay 6 connects the trunk of the group to the test circuit through the switch arm 7, the associated trunk group busy relay 2 is connected through the pattern relay 8 and thence through the switch arm 9.

In a manner to be more fully described hereinafter a test relay 10 will become energized when the first trunk of the group is reached by the arm 7 and will remain operated only so long as all the trunks of the group test busy. If all the trunks of the group are found to be busy then when the arm 7 is on the contact connected to the last trunk of the group a circuit for the trunk group relay 2 will be established from battery front contact and armature 3 of relay 10, left hand winding of relay 11, normal contacts of armature 3 of relay 12, switch arm 9, front contact and armature of pattern relay 8 a front contact and armature of relay 6 the winding of trunk group busy relay 2 to ground. Relay 2 will respond and lock over resistance 13 to battery. If on the other hand a single one of the trunks in the group had been found to be idle then relay 10 would have been released and hence ground would have been connected to its armature 3 instead of battery with the consequence that relay 2 would not have become operated or in case it were already locked up would be short-circuited and then released.

Since the various trunk group connector relays operate in rapid succession the interval between one and the next operation of relay 6 will be short since it may be arranged in any desired manner. Therefore, if the switch represented by the arm 7 and 9 go over a trunk group and find all the trunks busy it will operate relay 2 and this relay will remain locked up in this condition until the next time that relay 6 is operated. If in the meantime one or more of the trunks of the group become idle then upon the succeeding operation of relay 6 the trunks of the group will be successively tested and relay 2 will be released.

Fig. 3 represents an alternative arrangement in which the trunk group connector relay 14 connects each separate trunk 15 to a separate test relay 16. These test relays with their armatures and contacts control a chain circuit so that the trunks are tested simultaneously. If relay 16 represents the relay connected to the last trunk of the group and all of the trunks are busy then battery will be connected through the front contacts of these test relays to the armature of relay 16; thence through armature 2 and front contact of pattern relay 17, a front contact and armature of relay 14 to the trunk group busy relay 18. If any one of the trunks of the group were idle then ground at the back contact of the associated test relay would be extended over the chain circuit to release relay 18.

A point to be noted in connection with Fig. 3 is that by the operation of pattern relay 17 battery is connected to the front contact of the next chain relay 19 so that if this is the first relay of another group it will have the proper connection for operating the trunk group busy relay of the said next group. If the pattern relay 17 is associated with some other pattern and relay 16 is not the last of the group then the armature of relay 16 will be connected over armature 2 and back contact of relay 17 to the front contact of the next test relay 19.

Fig. 5 shows another alternative arrangement, similar in many respects to the all relay arrangement of Fig. 3. Here also there is one test relay 20 connected through the trunk group connector relay 21 to each line 22. The chain circuit through the armatures and contacts of these test relays is arranged in a different manner, however. Each back contact of a test relay is connected to a contact of a pattern relay and in the pattern relay each such contact is grounded for each active test relay. In this arrangement the test relay 23 next in order beyond the one connected to the last trunk of the group is not used and its back contact is connected in the pattern relay to battery. Since the trunk group busy relay 24 is connected through the trunk group connector relay 21 to the armature of the first test relay of its group, under an all trunks busy condition a circuit will be established from the winding of relay 24, through the armatures and front contacts of all of the test relays including the last test relay 20 of the group, thence over the armature and back contact of the next test relay 23 through an armature and front contact of the pattern relay 25 to battery. Thus the trunk group busy relay 24 will be operated under an all trunks busy condition. If any one of the trunks is idle then a ground will be connected over the back contact of the associated test relay to cause the relay 24 to release or if already released to prevent it from operating.

Conductor 26, connected to the front contact of test relay 23 and to the armature of the next test relay may be cross connected through a contact of relay 21 to the trunk group busy relay of the next group to be tested in a manner to be more fully described hereinafter.

*Detailed description*

In Figs. 7 and 8 there are shown three different pattern arrangements of groups of lines. At the top of Fig. 7 under a bracket marked "Pattern 0" there is shown a group of lines 27 and 28, line 27 representing the first and line 28 representing the last in a group of forty-four lines, this number being chosen since there is commercially available a simple stepping switch having this number of contacts (illustrated in Fig. 12). A group busy relay 29 is shown associated with this group of lines.

Under a bracket marked "Pattern 1" there are shown two groups of twenty-one lines each and two associated group busy relays. Thus lines 30, 31 and 32 represent the first, the second and the twenty-first lines, respectively, of the first group and relay 33 represents the group busy relay associated therewith. Lines 34, 35 and 36 represent the first, the second and the twenty-first lines, respectively, of the second group and relay 37 represents the group busy relay associated therewith. These two groups total forty-two lines and therefore for the purposes which will appear hereinafter the forty-third and forty-fourth line terminals in the group connector relay are grounded as though connected to busy lines.

Under a bracket marked "Pattern 3" there are shown eight subgroups of lines, four of five lines each and four of four lines each, totalling thirty-six in all. As before, the remaining terminals which would correspond to lines thirty-seven to forty-four, inclusive, are indicated as grounded. In this pattern lines 38 and 39 represent the first and the fifth lines, respectively, of the first group and relay 40 represents the group busy relay associated therewith. Likewise lines 59 and 60 represent the first and fourth lines, respectively, of the last group in this pattern and relay 61 represents the group busy relay associated therewith.

Any convenient number of patterns may thus be provided and as will appear hereinafter there is in the common apparatus a pattern relay for each such pattern provided. A trunk group larger than forty-four lines may be served through two or more group connector relays whereupon the group busy relay will be affected as at the end of any given grouping arrangement. If for instance a group of eighty-eight lines is provided then the first forty-four would appear in a pattern arrangement which provided for no group busy relay connection and the second forty-four would appear in a "Pattern 0" arrangement immediately following the first in rotation so that the group busy relay would be affected only after eighty-eight trunks have been tested. With this explanation it is believed that it will be clear how any sized trunk group may be served.

Figs. 9 and 10 show a plurality of trunk group connector relays 62, 63 and 64 representative of a large group thereof. These relays connect the lines of the groups together with the associated trunk group busy relays to the common testing apparatus. At the right in Fig. 10 there is shown a sequence circuit for sequentially operating the relays 62 to 64. The testing operation may be started by closing the key 65 after which the apparatus will continue to operate automatically so long as key 65 is maintained in its operated position.

Upon the closure of key 65 a circuit is established from ground to conductor 66, armature 2 and back contact of relay 67, the similar armatures and back contacts of the remaining relays in this chain, armature 2 and back contact of relay 68, the winding of relay 69 to battery. Relay 69 operates to cause the operation of relay 64. Also upon the operation of key 65 and as soon as switch arm 70 reaches its last contact in a manner to be more fully described hereinafter, ground will be extended to conductor 71 thence through the normal contacts of armature 3 of relay 72, resistance 74 to battery. Relay 72 operates and locks directly to ground over its armature 3. Relay 73 also has this ground extended to its winding but it is short-circuited until the ground is removed from conductor 71. As soon as switch arm 70 moves off its last contact relay 73 therefore becomes operated and by so doing extends a ground from conductor 66, through armature 1 and front contact of relay 73, armature 2 and front contact of relay 72, armature 1 and front contact of relay 69 to operate the trunk group connector relay 64. This circuit condition is maintained until switch arm 70 makes a complete rotation and again sends a ground impulse over conductor 71.

Responsive to this impulse relay 72 first releases and at the end of the impulse relay 73 releases. After relay 72 has released a circuit is established from ground, conductor 66, armature 1 and front contact of relay 73, armature 2 and back contact of relay 72, front contact and armature 2 of relay 69, winding of relay 68 to battery. Relay 68 locks through its front contact and armature 2 through a chain circuit extending through the back contact and armature 2 of the other relays in this chain including relay 67 to ground on conductor 66. The release of relay 73 also releases relay 64, and the operation of relay 68 releases relay 69. Now upon the following release of relay 73, ground is extended from conductor 66, through armature 1 and back contact of relay 73, armature 1 and back contact of relay 72, through front contact and armature 1 of relay 68 to cause the operation of relay 63. It is believed to be obvious how through successive applications of ground impulses to conductor 71 by switch arm 70 or other means, the trunk group connector relays 64, 63 and 62 will be successively operated.

The testing circuit is shown in Fig. 12. The switch arms 70 and 76 to 79, inclusive, are mounted on the same shaft and all revolve together under control of stepping magnet 80. During one complete revolution arms 76 and 77 successively connect forty-four lines to conductor 81. Relay 82 being now released a circuit will be established from ground, back contact and armature 1 of relay 82, armature 2 and back contact of relay 83, normal contacts of armature 1 of relay 84 winding of relay 84 to battery. Relay 84 will become energized and will lock to a ground on conductor 81. Upon the energization of relay 84 a circuit will be established from ground armature 1 and back contact of relay 83 front contact and armature 2 of relay 84, back contact and armature of the stepping magnet 80 to battery, whereupon the stepping magnet through its self interrupting contacts will step the switch arms around until this circuit is interrupted. In the meantime relay 82 which is in parallel with the winding of the stepping magnet 80 has become energized and has established a circuit in parallel with the front contact and armature of relay 84 so that the stepping of the switch arms will continue even after relay 84 becomes released. Relay 84 is fast to release and will immediately release if either arm 76 or arm 77 encounters an idle line. Relay 82, however, is slow to release and will hold up over the interruptions of its circuit by the armature and back contact of the stepping magnet 80. Since relay 82 has become operated and will remain operated throughout the continuous stepping of the switch arms then relay 84 if it becomes released will remain unoperated throughout the remainder of this period.

When the end of a group is reached a connection is made over a circuit to be more fully described hereinafter through a trunk group busy relay either switch arm 78 or 79, front contact and armature 3 of relay 82, right hand winding of relay 83 to a potentiometer point between resistances 85 and 86 and relay 83 will respond regardless of the operated or released condition of the trunk group busy relay. Relay 83 opens the circuit for the stepping magnet 80 and the switch arms come to rest on the last contact of the group. Relay 82 shortly thereafter releases and a circuit is now established over the normal contacts of armature 3 of relay 82, front contact and armature 3 of relay 83, left hand winding of relay 83, to armature 3 of relay 84 and this relay in accordance with its operated or released condition at this time will determine the condition in which the trunk group busy relay is to be left.

The purpose of the left-hand winding of relay 83 is to check the operation of the trunk group busy relay. If such relay is unoperated and in accordance with the condition of relay 84 it is to be operated, then relay 83 will be held through its left-hand winding until the trunk group busy relay has operated and connected its holding battery to its winding. If the trunk group busy relay is operated and is to be released, then relay 83 is held through its left-hand winding until the trunk group busy relay releases and establishes a ground to ground circuit. In either of the other two cases where the trunk group busy relay is to be left in the condition in which it is found the left-hand winding of relay 83 is ineffective and relay 83 will release.

The armature 3 and front contact of relay 83 is provided to insure against a false operation of the trunk group busy relay when operations for testing the next group are started.

In a short interval, then, relay 83 will release whereupon the operations just described will be repeated with respect to the next group of trunks. If relay 84 is still operated on the last test of the preceding group the release of relay 83 will immediately start the stepping magnet again and cause the energization of relay 82. If relay 83 is released it will first become energized as before and then start the stepping and cause the energization of relay 82. If, as when the connector relay 62 is energized the apparent first contact of the next group is contact 87 it will find this and the next succeeding seven contacts artificially grounded so that relay 84 will be maintained operated until the first contact of the next group is encountered by switch arm 76.

Looking at Fig. 9 it will be noted that each of the trunk group connector relays has one contact provided to operate a pattern relay and as many contacts provided as are necessary to connect the trunk group busy relays to the pattern relays. Thus relay 64 is provided with its extreme left-hand armature and a contact leading to pattern relay 88. It will be noted in Fig. 9 that the armatures and contacts of the trunk group connector relays are spread out somewhat. This is done to make the circuit arrangement clear and does not indicate any peculiar physical arrangement in the relay itself. Similarly in Fig. 11 the armatures and contacts of the pattern relays are spread out in a manner designed to make the circuit operations clear and does not reflect any peculiar physical construction of the relays. Thus pattern relay 88 is a simple relay having a single armature and a front contact of ordinary design and pattern relay 89 is a similar relay provided with two armatures and their front contacts. The vertical leads connected to the front contacts of these pattern relays are connected to the bank contacts of switch arms 78 and 79 and serve to make connections for the test which determines the end of the group and as means for thereupon properly controlling the trunk group busy relays.

The arrangement shown in the drawings indicated in Fig. 4 is one in which a testing relay is connected to each line and a test is then made by a chain circuit controlled by these relays. Thus relays 91 and 92 are connected to the first two contacts of the trunk group connector relays and relay 89 is connected to the last. If, by way of example, connector relay 64 is operated and every one of the forty-four trunks were busy then all of the relays in line from 91 to 89 would respond and close a complete chain from battery on the front contact of relay 91 to the armature of relay 89 which might then be traced through the armature and front contact of pattern relay 93, the next to the extreme left contact and armature of relay 64 to the trunk group busy relay 29. If there were only one pattern such as that provided by relay 93 then the chain controlled by the test relays would be simple, the armature of each being connected to the front contact of the next. However, to provide for breaking this chain into a number of smaller chains each appropriate for a smaller group certain contact arrangements are provided by the pattern relays. Thus a connection may be traced from the armature of test relay 94, through armature 2 and back contact of pattern relay 95 to the front contact of test relay 96 since pattern relay 95 is not energized at this time.

In the case where connector relay 62 is energized and where therefore pattern relay 95 is energized, then the armature of relay 94, which is the last relay of the group, is connected through armature 2 and front contact of relay 95 and thence to trunk group busy relay 40. At the same time the armature 1 of relay 95 connects battery to the front contact of test relay so that this relay may now act as the first of a group.

If any two or more patterns happen to involve the same group number then the armature of the test relay will thread through two or more pattern relay contacts in an obvious chain circuit therein.

In this arrangement since the testing of all the lines is done simultaneously and there is no switch arm such as 70 to periodically apply a ground impulse to conductor 71 a well-known type of vibrating relay is employed. Thus with ground connected to conductor 66, relay 97 will vibrate at a given rate and periodically apply ground to conductor 71.

The arrangement indicated by Fig. 6 is a third species of the present invention, characterized by a different arrangement of the testing relay chain circuit and the manner in which it is broken up into smaller chains. Here as in the previous case each line to be tested is connected to a separate testing relay. The pattern relays, however, are quite differently arranged. Here each pattern relay has a contact for the back contact of each testing relay plus one extra one for the front contact of the last one. Here by way of example, forty-four testing relays are shown so each pattern relay has forty-five pairs of contacts. Certain of these will be connected to battery and the remainder will be connected to ground. Thus in "Pattern 0" the pattern relay 100 has forty-four contacts grounded and the forty-fifth (counting from the right) connected to battery. Thus if all forty-four lines are busy battery will be connected through the chain and eventually be connected to the armature of relay 101, thence through the cross connection 102 through the next to the extreme left-hand contact of group connector relay 103 to the winding of trunk group busy relay 29. If any one of the lines of this group of forty-four is idle then the chain from battery will be broken and ground will be substituted at the back contact of the non-operated test relay.

Now let us suppose that trunk group connector relay 104 is energized and that consequently pattern relay 105 is energized. The circuit for trunk group busy relay 33 may be traced over armature 3 and front contact of relay 104, cross connection 106, armature of test relay 101, and assuming all of the twenty-one trunks in this group to be busy over the chain circuit to the front contact of test relay 107, the armature and back contact of test relay 108 and twenty-second (counting from the right) front contact and armature of pattern relay 105. If any one of the tested lines is idle then ground at the back contact of the corresponding test relay will be substituted for battery with a consequent different control of relay 33. It should be noted here that in this pattern, the contact of connector relay 104 connected to test relay 108 is left idle so that the chain will perforce be broken at the armature of relay 108. By the same token a circuit may be traced from trunk group busy relay 37, over armature 2 and front contact of relay 104, cross connection 109, front contact of test relay 108 and armature of test relay 110 and now assuming that all lines in this group are busy, through the chain to the armature and front contact of test relay 111, the armature and back contact of test relay 112, the forty-fourth (counting from the right) front contact and armature of pattern relay 105 to battery. If any one or more of these lines are idle then ground at the back contact of the corresponding test relay will be substituted for battery with a consequently corresponding action of the trunk group busy relay 37.

Similar arrangements in other patterns are provided and the connections for pattern 3 provided by connector relay 113 and pattern relay 114 will be evident from a simple inspection.

One other difference may be noted on Fig. 17. The vibrating relay 115 operates as before in a conventional manner. The contact arrangement of relays 116 and 117 is slightly different however. Relay 118 will energize upon the operation of key 119 and then upon the first operation of relay 116 the connector relay 103 will respond. Upon the following energization of relay 117, relay 103 will be released and relay 119 will be operated, relay 118 falling off shortly thereafter in accordance with its slow releasing characteristics. Upon the following deenergization of relay 116 the connector relay 104 will become energized. Upon the following deenergization of relay 117, relay 104 will be released, the next relay in the chain of relays 118, 119, etc. will be operated and in due time relay 119 will release. In this manner the trunk group connector relays will be successively and continuously operated to successively and continuously subject the various groups of lines to test, leaving the corresponding trunk group test relays in corresponding conditions during the intervals between successive tests.

What is claimed is:

1. In a system comprising a plurality of similar electrical circuits each of which may be individually marked as either busy or idle, said circuits being divided into groups and subgroups, a relay for each said subgroup for indicating by its operated or released condition the fact that all of the circuits of the corresponding subgroup are busy or the fact that one or more of the circuits of the corresponding subgroup are idle, a testing arrangement for testing the individual circuits of a subgroup, means responsive to said testing arrangement for recording the condition found on the said corresponding subgroup relay, and means for successively and periodically connecting groups of said circuits to said testing arrangement.

2. In a system comprising a plurality of similar electrical circuits each of which may be individually marked as either busy or idle, said circuits being divided into groups and subgroups, a relay for each said subgroup for indicating by its operated or released condition the fact that all of the circuits of the corresponding subgroup are busy or the fact that one or more of the circuits of the corresponding subgroup are idle, a testing arrangement for testing the individual circuits of a subgroup, means responsive to said testing arrangement for recording the condition found on the said corresponding subgroup relay, and means for successively and periodically connecting groups of said circuits and the corresponding said subgroup relays to said testing arrangement.

3. In a system comprising a plurality of similar electrical circuits each of which may be individually marked as either busy or idle, said circuits being divided into groups and subgroups, a relay for each said subgroup for indicating by its operated or released condition the fact that all of the circuits of the corresponding subgroup are busy or the fact that one or more of the circuits of the corresponding subgroup are idle, a testing arrangement for successively testing the individual circuits of a subgroup, means responsive to said testing arrangement for recording the condition found on the said corresponding subgroup relay, and means for successively and periodically connecting groups of said circuits and the corresponding said subgroup relays to said testing arrangement.

4. In a system comprising a plurality of similar electrical circuits each of which may be individually marked as either busy or idle, said circuits being divided into groups and subgroups, a relay for each said subgroup for indicating by its operated or released condition the fact that all of the circuits of the corresponding subgroup are busy or the fact that one or more of the circuits of the corresponding subgroup are idle, a testing arrangement for simultaneously testing the individual circuits of a subgroup, means responsive to said testing arrangement for recording the condition found on the said corresponding subgroup relay, and means for successively and periodically connecting groups of said circuits and the corresponding said subgroup relays to said testing arrangement.

5. In a system comprising a plurality of similar electrical circuits each of which may be individually marked as either busy or idle, said circuits being divided into groups and subgroups, a relay for each said subgroup for indicating by its operated or released condition the fact that all of the said circuits of the corresponding subgroup are busy or the fact that one or more of the said circuits of the corresponding subgroup are idle, a pattern connection individual to each said group of circuits for indicating the number and size of the subgroups of circuits included therein, a testing arrangement for testing the individual circuits of a group and for recording the conditions found on the corresponding subgroup relays of said group, said testing arrangement including pattern relays responsive to said pattern connections for controlling said testing arrangement, and means for successively and periodically connecting groups of circuits, the corresponding subgroup relays and the corresponding pattern connections to said testing arrangement.

6. In a system comprising a plurality of similar electrical circuits each of which may be individually marked as either busy or idle, said circuits being divided into groups and subgroups, a relay for each said subgroup for indicating by its operated or released condition the fact that all of the said circuits of the corresponding subgroup are busy or the fact that one or more of the said circuits of the corresponding subgroup are idle, a pattern connection individual to each said group of circuits for indicating the number and size of the subgroups of circuits included therein, a testing arrangement for testing the individual circuits of a group and for recording the conditions found on the corresponding subgroup relays of said group, means in said testing arrangement for detecting the subgroup end points, said testing arrangement including pattern relays responsive to said pattern connections for extending connections from said subgroup relays to prearranged points in said testing arrangement to constitute subgroup end points, and means for successively and periodically connecting groups of circuits, the corresponding subgroup relays and the corresponding pattern connections to said testing arrangement.

7. In a system comprising a plurality of similar electrical circuits each of which may be individually marked as either busy or idle, said circuits being divided into groups and subgroups, said groups having said subgroups arranged according to size and number in a plurality of different patterns, a relay for each said subgroup for indicating by its operated or released condition the fact that all of the circuits of the corresponding subgroup are busy or the fact that one or more of the circuits of the corresponding subgroup are idle, a testing arrangement comprising a test relay for each line of the group being tested, a chain circuit controlled by said test relays, a plurality of pattern relays for dividing said chain circuit into a plurality of smaller chain circuits in accordance with the subgroup pattern of the group being tested, each said smaller chain circuit controlling the corresponding subgroup relay, and means for successively and periodically connecting groups of said circuit and the corresponding said subgroup relays to said testing arrangement.

8. In a system comprising a plurality of similar electrical circuits each of which may be individually marked as either busy or idle, said circuits being divided into groups and subgroups, a relay individual to each said subgroup for indicating by its operated or released condition the fact that at the time the last previous test was made all of the circuits of the corresponding subgroup were busy or one or more of the circuits of the corresponding subgroup were idle, a testing arrangement for testing the individual circuits of a subgroup and for controlling the corresponding subgroup relay in accordance with the result of such test, and means for successively and periodically connecting groups of said circuits to said testing arrangement.

9. In a system comprising a plurality of similar electrical circuits each of which may be individually marked as either busy or idle, said circuits being divided into groups and subgroups, a relay individual to each said subgroup for indicating by its operated or released condition the fact that at the time the last previous test was made all of the circuits of the corresponding subgroup were busy or one or more of the circuits of the corresponding subgroup were idle, a locking circuit for said relay to hold it in an operated condition between successive tests following a controlling impulse driving it to such an operated condition, a testing arrangement for testing the individual circuits of a group, means responsive thereto for applying to the associated subgroup relays operating or releasing impulses and means for successively and periodically connecting groups of said circuits and the corresponding said subgroup relays to said testing and controlling arrangement.

AMOS E. JOEL, Jr.